(12) United States Patent
Wei et al.

(10) Patent No.: US 11,532,065 B2
(45) Date of Patent: Dec. 20, 2022

(54) SYSTEMS AND METHODS OF INDOOR NAVIGATION FOR EMERGENCY SERVICES

(71) Applicant: MappedIn Inc., Waterloo (CA)

(72) Inventors: Erkang Wei, Waterloo (CA); Mario Grgic, Waterloo (CA); George Aleksander Plukov, Richmond Hill (CA); Paul Bernhardt, Kitchener (CA)

(73) Assignee: MappedIn Inc., Waterloo (CA)

( * ) Notice: Subject to any disclaimer, the term of this patent is extended or adjusted under 35 U.S.C. 154(b) by 896 days.

(21) Appl. No.: 16/400,673

(22) Filed: May 1, 2019

(65) Prior Publication Data

US 2019/0392545 A1    Dec. 26, 2019

Related U.S. Application Data

(60) Provisional application No. 62/687,867, filed on Jun. 21, 2018.

(51) Int. Cl.
*H04W 4/02* (2018.01)
*G06Q 90/00* (2006.01)
*H04W 4/024* (2018.01)
*G01C 21/20* (2006.01)

(52) U.S. Cl.
CPC .......... *G06Q 90/20* (2013.01); *G01C 21/206* (2013.01); *H04W 4/024* (2018.02)

(58) Field of Classification Search
CPC .............................. H04W 36/22; H04W 76/27
See application file for complete search history.

(56) References Cited

U.S. PATENT DOCUMENTS

| 8,712,688 B2 * | 4/2014 | Forte ....................... G06F 16/29 |
| | | 701/434 |
| 9,702,706 B2 | 7/2017 | Liu et al. |
| 2014/0156186 A1 | 6/2014 | Liu et al. |
| 2017/0284811 A1 | 10/2017 | Liu et al. |
| 2017/0286450 A1 * | 10/2017 | Jones .................... G06F 16/907 |
| 2018/0283876 A1 | 10/2018 | Cregan |

FOREIGN PATENT DOCUMENTS

CA    3009211 A1    12/2018

* cited by examiner

*Primary Examiner* — Michael T Vu
(74) *Attorney, Agent, or Firm* — Own Innovation; James W. Hinton

(57) ABSTRACT

Systems and methods for providing indoor navigation to emergency services are disclosed. The methods involve storing at least one electronic map of a facility and at least one annotation for the at least one electronic map. The at least one annotation can be representative of a service resource within the facility. The method also involves receiving a traversed area from at least one computing device within the facility during an event; determining a total traversed area based on the traversed area from each of the at least one computing device during the event; and providing the at least one annotation and the total traversed area within the at least one electronic map to be displayed on at least one graphical user interface.

18 Claims, 9 Drawing Sheets

SYSTEMS AND METHODS OF INDOOR NAVIGATION FOR EMERGENCY SERVICES

TECHNICAL FIELD

The embodiments disclosed herein relate to indoor maps, and, in particular to systems and methods of indoor navigation for emergency services.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

Wayfinding within a facility can be particularly time-sensitive for emergency service personnel. When emergency service personnel attend to an emergency event at a facility, they require accurate knowledge of key areas within the facility and how to navigate the facility, such as emergency routes. Emergency service personnel may be responsible for evacuation of the facility and may conduct a strategic "sweep" of the facility to ensure safety and security. Since emergency service personnel are not typically present at any given venue or facility on a daily basis, they may not be as familiar with the venue or facility and instead, rely on maps of the venue or facility.

SUMMARY

Digital mapping may provide some advantages over static paper maps. One of these advantages may be the opportunity to consume an electronic representation of a facility which serves as a more up-to-date and relevant representation of a given real-world space.

Emergency service personnel can require specific information about the real-world space that is not included in digital maps for typical users or patrons of the facility. Examples of emergency service specific information include, but is not limited to, resources such as fire hydrants, fire hoses, and gas shut-off valves. Such information is typically provided to emergency services at the development phase of a facility or venue but can change thereafter.

To help emergency service personnel navigate venues and facilities during an emergency event, a wayfinding system may provide one or more emergency service indoor navigation tools or frameworks. The emergency service indoor navigation tools may use up-to-date data from existing wayfinding system, may be part of existing wayfinding systems, and may be accessed, for example, via portal management module or in any other suitable way. The subject matter of the present application can also highlight important and useful information specific to emergency services. The subject matter of the present application can track the position of emergency service personnel during an emergency event.

The various embodiments described herein generally relate to methods (and associated systems configured to implement the methods) for providing indoor navigation to emergency services. The method involves storing at least one electronic map of a facility and at least one annotation for the at least one electronic map. The at least one annotation can be representative of a service resource within the facility. The method also involves receiving a traversed area from at least one computing device within the facility during an event; determining a total traversed area based on the traversed area from each of the at least one computing device during the event; and providing the at least one annotation and the total traversed area within the at least one electronic map to be displayed on at least one graphical user interface.

In some aspects, determining a total traversed area based on the traversed area from each of the at least one computing device during the event involves comparing a first traversed area from a first computing device and a second traversed area from a second computing device; and if the first traversed area of the first computing device contains the second traversed area of the second computing device, excluding the second traversed area of the second computing device from the total traversed area; otherwise including at least a portion of the second traversed area of the second computing device in the total traversed area, the at least a portion of the second traversed area of the second computing device being outside of the first traversed area.

In some aspects, determining a total traversed area based on the traversed area from each of the at least one computing device during the event involves, for each computing device: comparing a first traversed area at a first time instance from the computing device and a second traversed area at a second time instance from the computing device; and if the first traversed area at the first time instance from the computing device is the same as the second traversed area at the second time instance from the computing device, excluding the second traversed area from the total traversed area; otherwise including the second traversed area in the total traversed area.

In some aspects, providing the at least one annotation and the total traversed area within the at least one electronic map to be displayed on at least one graphical user interface further involves providing a current position of each of the at least one computing device, the current position of a computing device being a most recent instantaneous position of that computing device.

In some aspects, the traversed area includes an instantaneous position of a computing device within the facility.

In some aspects, providing the at least one annotation and the total traversed area within the at least one electronic map to be displayed on at least one graphical user interface further involves providing a current position of each of the at least one computing device, the current position of a computing device being a most recent instantaneous position of that computing device.

In some aspects, the instantaneous position of the computing device within the facility is determinable from at least one facility communication component located within the facility.

In some aspects, the instantaneous position of the computing device within the facility is determined on a pre-defined timing interval.

In some aspects, the pre-defined timing interval is about 1 second.

In some aspects, the instantaneous position of the computing device within the facility includes a latitude, a longitude, and a floor number within the facility.

In some aspects, at least one graphical user interface of the at least one graphical user interface is provided on a computing device of the at least one computing device.

In some aspects, the at least computing device includes at least one of a wearable device, a smart watch, a mobile device, a smart phone, and a tablet.

In some aspects, the method further involves storing the traversed area from each of the at least one computing device during the event for replay after the event.

In another broad aspect, a system of indoor navigation for emergency services is disclosed. The system includes at least one storage component for storing at least one electronic map of a facility and at least one annotation for the at least one electronic map, a communication component to transmit data including a traversed area within the facility from at least one computing device via a communication network, and a processor operatively coupled to the at least one storage component and the communication component. The at least one annotation is representative of a service resource within the facility. The processor is configured for receiving the traversed area from each of the at least one computing device within the facility during an event; determining a total traversed area based on the traversed area from each of the at least one computing device during the event; and providing the at least one annotation and the total traversed area within the at least one electronic map to be displayed on at least one graphical user interface.

In some aspects, the processor being configured for determining a total traversed area based on the traversed area from each of the at least one computing device during the event includes the processor being configured for comparing a first traversed area from a first computing device and a second traversed area from a second computing device; and if the first traversed area of the first computing device contains the second traversed area of the second computing device, excluding the second traversed area of the second computing device from the total traversed area; otherwise including at least a portion of the second traversed area of the second computing device in the total traversed area, the at least a portion of the second traversed area of the second computing device being outside of the first traversed area.

In some aspects, the processor being configured for determining a total traversed area based on the traversed area from each of the at least one computing device during the event includes the processor being configured for, for each computing device: comparing a first traversed area at a first time instance from the computing device and a second traversed area at a second time instance from the computing device; and if the first traversed area at the first time instance from the computing device is the same as the second traversed area at the second time instance from the computing device, excluding the second traversed area from the total traversed area; otherwise including the second traversed area in the total traversed area.

In some aspects, the processor being configured for providing the at least one annotation and the total traversed area within the at least one electronic map to be displayed on at least one graphical user interface further includes the processor being configured for providing a current position of each of the at least one computing device, the current position of a computing device being a most recent instantaneous position of that computing device.

In some aspects, the traversed area includes an instantaneous position of a computing device within the facility.

In some aspects, the processor being configured for providing the at least one annotation and the total traversed area within the at least one electronic map to be displayed on at least one graphical user interface further includes the processor being configured for providing a current position of each of the at least one computing devices, the current position of a computing device being a most recent instantaneous position of that computing device.

In some aspects, the instantaneous position of the computing device within the facility is determinable from at least one facility communication component located within the facility.

In some aspects, the instantaneous position of the computing device within the facility is determined on a pre-defined timing interval.

In some aspects, the pre-defined timing interval is about 1 second.

In some aspects, the instantaneous position of the computing device within the facility includes a latitude, a longitude, and a floor number within the facility.

In some aspects, the at least one annotation for the at least one electronic map includes an icon and a position of the service resource within the facility.

In some aspects, the service resource within the facility includes at least one of a standpipe connection, a sprinkler pipe connection, a fire hydrant, a gas shut off, a lock box, a fan, a waste disposal room, a waste disposal chute, a waste disposal dumpster, a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and a defibrillator.

In some aspects, a graphical user interface of the at least one graphical user interface is provided on a computing device of the at least one computing device.

In some aspects, the at least computing device includes at least one of a wearable device, a smart watch, a mobile device, a smart phone, and a tablet.

In some aspects, the processor is further configured for storing the traversed area from each of the at least one computing device during the event in the at least one storage component for replay after the event.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
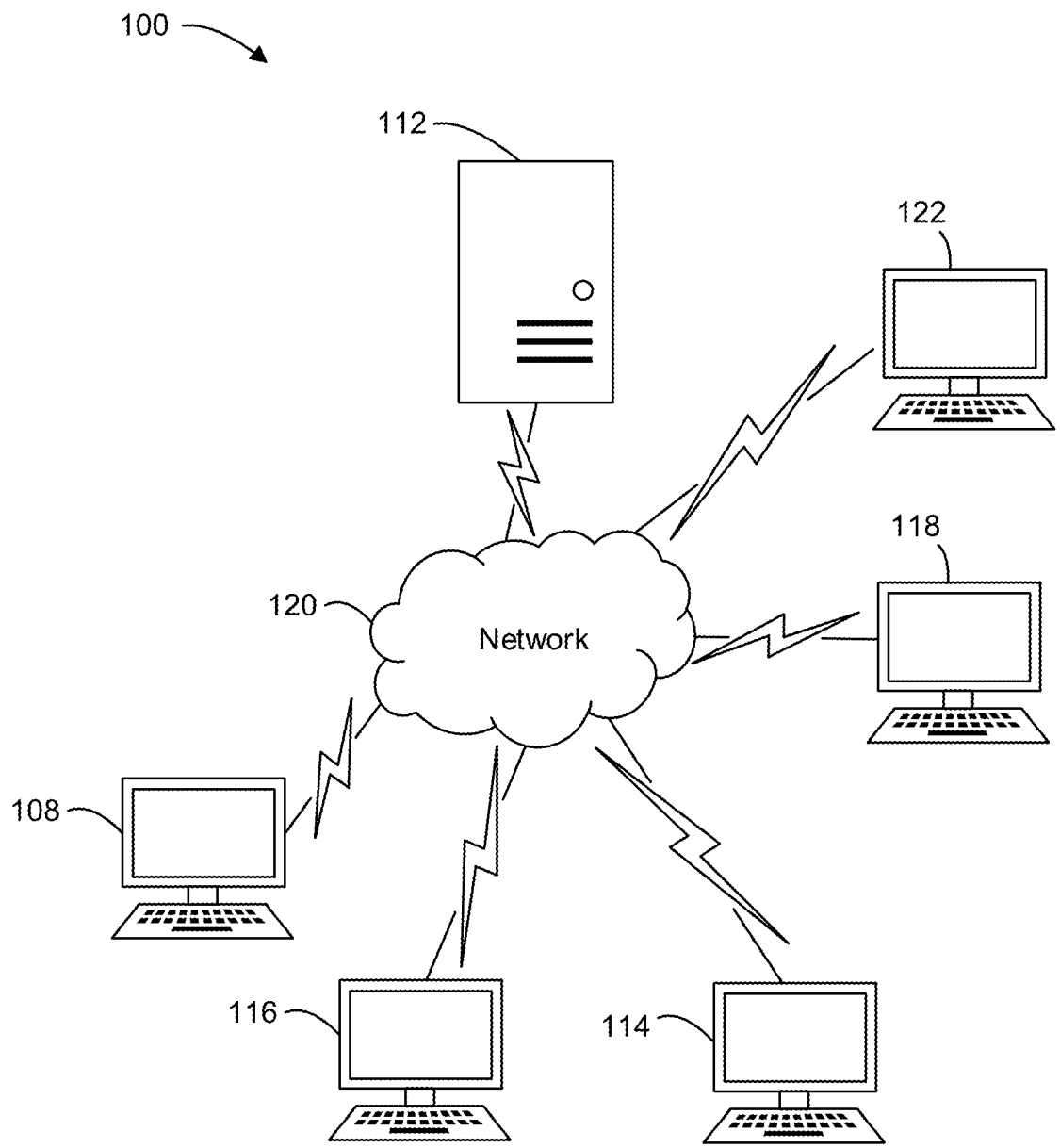
FIG. 1 is a diagram of a wayfinding system, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Emergency service personnel may arrive at a facility in response to an emergency situation. Emergency service personnel (i.e., emergency responders, first responders) can include, but is not limited to, firefighters, police or law enforcement, and ambulance. Typically, at least one individual is designated as a commander for each emergency service. For example, a platoon chief can be a commander of a platoon of firefighters.

Often times, a commander refers to a hardcopy map of the facility to assess the situation and, using radio-communications, sends or directs emergency service personnel within the facility based on their understanding of the facility from the map. For example, firefighters can be directed by their platoon chief to evacuate a building or to rescue someone, including other emergency service personnel (i.e., other firefighters) that are already in the building. In extreme circumstances, the commander may even need to decide whether to stop sending additional emergency service personnel into the facility.

However, the hardcopy map can be out of date. Furthermore, it can be difficult for a commander to know the location of the emergency service personnel based on radio communications alone. As well, the conditions within the facility may change as the emergency event progresses. For example, various paths may become obstructed or unsafe to use.

In another example, police may conduct a sweep, or inspection of a building to secure the building against threats (i.e., locate threats). Similar challenges can exist when a sweep is conducted. Generally, it is important for emergency service personnel, particularly a commander, to know where the emergency service personnel have been, where they are currently located, and where they should go.

FIG. 1 shows a block diagram illustrating one exemplary embodiment of a wayfinding system 100 for indoor navigation. The wayfinding system 100 is for a facility including multiple objects i.e., a facility wayfinding system. The wayfinding system 100 is not restricted to a single facility, but may be extended to multiple facilities of the same type and/or different types, each including multiple objects. Examples of objects that may be included in a given facility can include facility units, obstructions, connections, regions and the like. For the purposes of this description, facility units may be configured as stores, rooms and other types of identifiable, generally bounded structures that may form a part of a larger facility.

For example, stores within a shopping center, offices within a commercial office building, classrooms within a school, patient rooms within a hospital, bathrooms inside other structures and the like. Obstructions may be objects that are generally not traversable by the wayfinding system 100 end users and that may tend to impede navigation throughout the facility. Examples of obstructions can include tables, benches, shelves, beds, other furniture, fountains, sculptures and other objects that are placed within a facility or facility unit but typically do not form part of the structure of the facility or facility unit. Connections may be portions of a facility or facility unit that extend between, and connect, two or more traversable areas within the wayfinding system 100. Examples of connections may include hallways, walkways, staircases, elevators, escalators, ramps, moving walkways and the like. Regions may be regions of the facility and/or a facility unit that are generally open, at least partially traversable areas that are not bounded by walls. Examples of regions can include, atriums, foyers, event spaces, stages, open floor area in a store, concourses, public squares, courtyards and the like.

The wayfinding system 100 allows users, e.g., visitors to the facility, to orient themselves and to navigate from place to place within the facility, enabling them to find what they are looking for and to discover things around them. For example, a shopper at a mall can use the wayfinding system 100 to search for a particular store or a particular item or class of items (e.g., shoes), navigate to the relevant location, and/or look at the current promotions.

The facility may be any type of facility, and may include a single building or two or more separate buildings, each of which may include any suitable facility units and other objects. Typically, the facility is a commercial facility or an institutional facility. For example, the facility may be a retail facility (e.g., a mall or a shopping center), an office facility (e.g., an office building), an event facility (e.g., a conference center), an amusement park, or a theme park, a transportation facility (e.g., an airport, or a bus terminal), an educational facility (e.g., a school or a university campus), or a medical facility (e.g., a hospital). The facility may be an indoor, an outdoor facility and/or may include a combination of indoor and outdoor portions. However, the wayfinding systems described herein may be particularly useful for indoor facilities and/or facilities with at least some indoor portions.

The facility units in a given facility may be any type of suitable facility units. For example, the facility units may be commonly managed as part of the facility. Some examples of facility units include stores, restaurants, booths, offices, rooms, halls, washrooms, airport gates, and/or locations or areas within the facility. A given facility may include only a single type of facility units, or alternatively a facility may include a mixture of different types of facility units.

The wayfinding system 100 may include a facility wayfinding system, such as those described in U.S. Pat. No. 9,702,706, which is hereby incorporated by reference in its entirety.

In the illustrated example, the wayfinding system 100 includes a server platform 112, which communicates with a plurality of store devices 114, a plurality of facility devices 116, a plurality of administrator devices 118, and a plurality of emergency service provider devices 108 via a communication network 120. The server platform 112 also communicates with a plurality of visitor devices 122. The server platform 112 may be a purpose built machine designed specifically for implementing a system and method for indoor navigation.

The server platform 112, store devices 114, facility devices 116, administrator devices 118, emergency service provider devices 108, and visitor devices 122 may be a server computer, desktop computer, notebook computer, tablet, PDA, smartphone, or another computing device. The devices 112, 108, 114, 116, 118, and 122 may include a connection with the communication network 120 such as a wired or wireless connection to the Internet. In some cases, the communication network 120 may include other types of computer or telecommunication networks. The devices 112, 108, 114, 116, 118, and 122 may include one or more of a memory, a secondary storage device, a storage component, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor of each of devices 112, 108, 114, 116, 118, and 122 may execute applications, computer readable instructions or programs. The applications, computer readable instructions or programs may be stored in memory or in secondary storage, or may be received from the Internet or other communication network 120. Input device may include any device for entering information into device 112, 108, 114, 116, 118, and 122. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 112, 108, 114, 116, 118, and 122 may include multiple of any one or more of processors, applications, software modules, second storage devices, network connections, input devices, output devices, and display devices.

Although devices 112, 108, 114, 116, 118, and 122 are described with various components, one skilled in the art will appreciate that the devices 112, 108, 114, 116, 118, and 122 may, in some cases, contain fewer, additional or different components. In addition, although aspects of an implementation of the devices 112, 114, 116, 118, 108, and 122 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the devices 112, 108, 114, 116, 118, and 122 and/or processor to perform a particular method.

In the description that follows, devices such as server platform 112, store devices 114, facility devices 116, administrator devices 118, emergency service provider devices 108, and visitor devices 122 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 108, 114, 116, 118, and 122 may send information to and receive information from the server platform 112. For example, a store user using the store device 114 may manipulate one or more input devices (e.g. a mouse and a keyboard) to interact with a user interface displayed on a display of the store device 114 to respond to questions. Generally, the device may receive a user interface from the communication network 120 (e.g. in the form of a webpage). Alternatively or in addition, a user interface may be stored locally at a device (e.g. a cache of a webpage or a mobile application).

Server platform 112 may be configured to receive a plurality of information, from each of the plurality of store devices 114, facility devices 116, administrator devices 118, emergency service provider devices 108, and visitor devices 122. The store devices 114, facility devices 116, administrator devices 118, emergency service provider devices 108, and visitor devices 122 are herein referred to as user computing devices, or computing devices. Generally, the information may comprise at least an identifier identifying the user who may be associated with a store, associated with a facility, an administrator of the system, an emergency service provider of the facility, or visitor of the store or facility. For example, the information may comprise one or more of a username, e-mail address, password, or social media handle.

In response to receiving information, the server platform 112 may store the information in a storage database. The storage database may correspond with secondary storage of the device 112, 114, 116, 118, and 122. Generally, the storage database may be any suitable storage device such as a hard disk drive, a solid state drive, a memory card, or a disk (e.g. CD, DVD, or Blu-ray etc.). Also, the storage database may be locally connected with server platform 112. In some cases, storage database may be located remotely from server platform 112 and accessible to server platform 112 across the communication network 120 for example. In some cases, storage database may comprise one or more storage devices located at a networked cloud storage provider.

The store device 114 may be associated with a store account. Similarly, the facility device 16 may be associated with a facility account, the administrator device 118 may be associated with an administrator account, the emergency service provider device 108 may be associated with an emergency service provider (i.e., first responders) account, and the visitor device 122 may be associated with a visitor account. Any suitable mechanism for associating a device with an account is expressly contemplated. In some cases, a device may be associated with an account by sending credentials (e.g. a cookie, login, or password etc.) to the server platform 112. The server platform 112 may verify the credentials (e.g. determine that the received password matches a password associated with the account). If a device is associated with an account, the server platform 112 may consider further acts by that device to be associated with that account.

The devices 108, 114, 116, 118, and 122 and the server platform 112 may communicate asynchronously, for example, by using an implementation of the WebSocket protocol, such as Socket.IO. Updates may be sent from the server platform 112 to each of the devices 108, 114, 116, 118, and 122 in real time as interrupts, i.e., without polling. Likewise, user interaction data may be sent from each of the devices 108, 114, 116, 118, and 122 to the server platform 112 in real time as interrupts, i.e., without polling.

Figure 2:
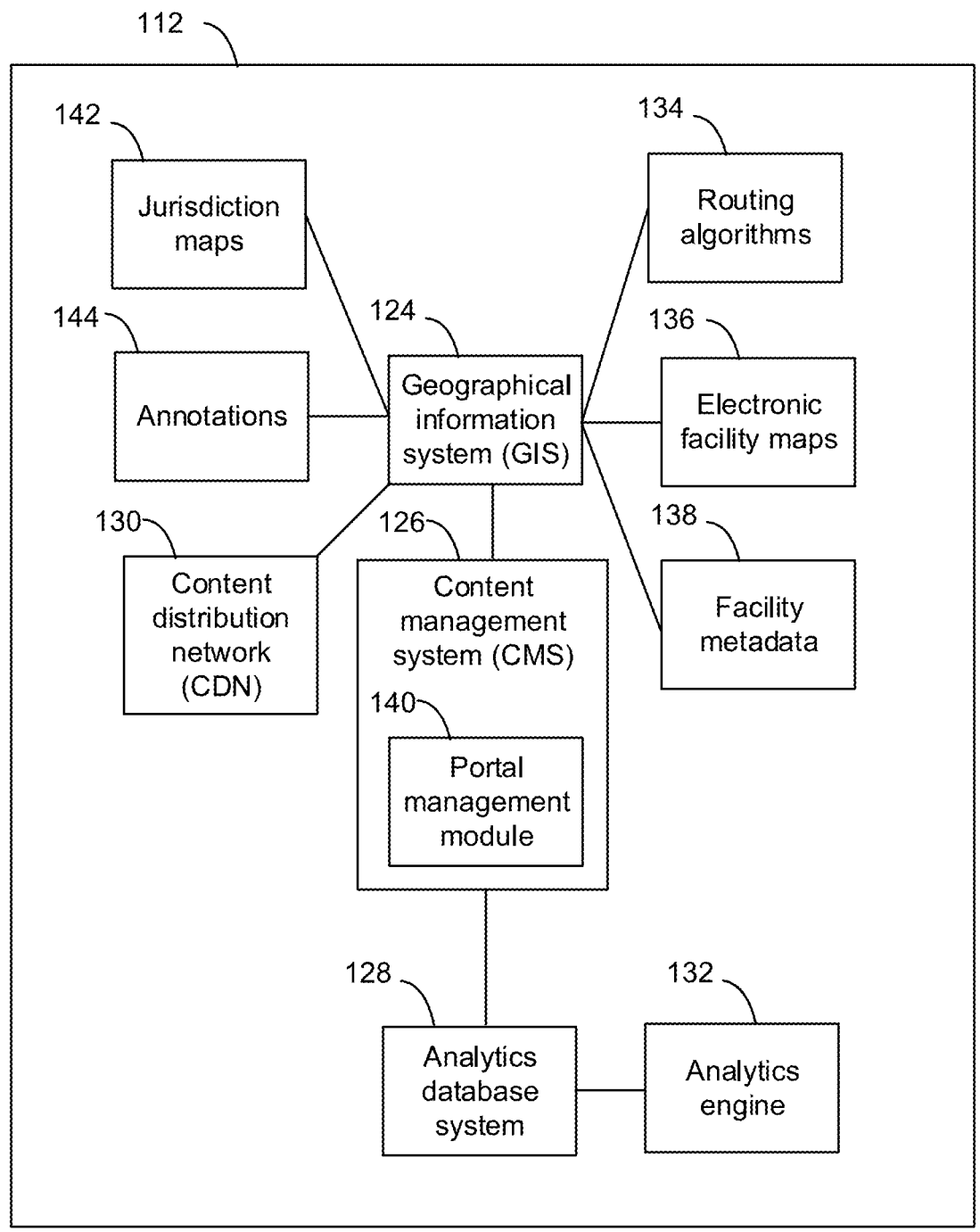
FIG. 2 is block diagram of a server platform of the wayfinding system of FIG. 1.

Turning now to FIG. 2, illustrated therein is the server platform 112, in accordance with an embodiment. The server platform 112 includes a content management system (CMS) 126, an analytics database system 128, and a geographical information system (GIS) 124. The server platform 112 may include multiple backend devices, e.g., servers. The server platform 112 may include at least a database server and a hosting server. In some instances, the server platform 112 also includes a content distribution network (CDN) 130. The CMS 126 and the analytics database system 128 may be hosted by the server platform 112. The GIS 124 may be hosted internally by the server platform 112 or supplied externally. In some embodiments, each of the GIS 124, CMS 126, analytics database system 128, CDN 130, analytics engine 132, and portal management module 140 may be combined into a fewer number of components or may be separated into further components.

In some embodiments, the CMS 126 may be a front end interface application, typically, implemented as a web service. CMS 126 may communicate with GIS 124, which then modifies the database. In this case, GIS 124 may be an Application Program Interface (API), which manipulates the database.

In some embodiments, CMS 126 stores content, including information relating to the facility and the facility units, handles updates to the content received from the devices 108, 114, 116, 118, and 122, and provides content to the devices 108, 114, 116, 118, and 122. For example, the CMS 126 may be a no structured query language (NoSQL) database application. The content stored in the CMS 126 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units may be tied to a related entry in the facility metadata 138 stored in the GIS 124. This may allow larger, less frequently accessed files to be stored in the CMS 126, rather than the GIS 124.

In some embodiments, the analytics database system 128 includes or is operatively connected to an analytics engine 132. The analytics database system 128 may be a database application, typically implemented as a web service. The analytics database system 128 stores all user interactions, e.g., user selections or "hits", searches, dates, types of mobile device, and/or movement patterns represented as heat maps, in real time, and generates analytics relating to the user interactions. Advantageously, because user interactions are recorded for several different the devices 108, 114, 116, 118, and 122, a relatively large sample size is obtained. The large sample size may allow analytics engine 132 to plot heat maps that are useful for users and to provide suggestions to improve user experience.

The GIS 124 is, typically, a representational state transfer (REST)-ful application programming interface (API). The GIS 124 includes routing algorithms 134, electronic facility maps 136, associated facility metadata 138, jurisdiction maps 142, and annotations 144. The GIS 124 may store the electronic facility maps 136, the facility metadata 138, jurisdiction maps 142, and annotations 144, handle updates to the electronic facility maps 136, the facility metadata 138, jurisdiction maps 142, and annotations 144 and provide the electronic facility maps 136, the facility metadata 138, and the annotations 144 to the devices 108, 114, 116, 118, and 122. Typically, the GIS 124 serves the electronic facility maps 136, e.g., as PNG files, and the facility metadata 138, e.g., as JSON/XML files, over the web. The facility metadata 138 is customizable for the type of facility, and may include digital representations of paths, polygons encapsulating facility units, nodes corresponding to facility locations, identifiers for each facility unit, and qualitative metadata, such as the type of path, e.g., hallway or dirt trail. Optionally, information about the objects utilized for a given system (i.e. all of the objects that are used to define a given facility, etc.) can be stored in the server platform in an object library that can be a separate module on the server platform 112, or may be incorporated within the electronic facility maps 136 module, facility metadata module 138 or any other suitable location.

The GIS 124 also uses the routing algorithms 34 to calculate routes and provides the routes to the devices 108, 114, 116, 118, and 122. Typically, the routing calculations output a JSON/XML list of node or polygon identifiers representing a complete path, which the devices 108, 114, 116, 118, and 122 will interpret and display. The output may also include points of interest and other metadata 138, such as total estimated travel time based on type of path and real-time traffic, as described herein.

The visitor devices 122 may be efficiently managed and run both online and offline. The visitor devices 122 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 122 may be configured to provide a smooth, intelligent personal indoor navigation experience. Visitors can access directions and venue information from anywhere in the venue. Alternatively or additionally, visitors can plan routes prior to arriving and contact a location by phone or via social media directly from their personalized profile.

The server platform 112 may include a portal management module 140 for managing the wayfinding system 100. As shown in FIG. 2, the portal management module 140 is a module within the CMS 126. In other embodiments, the portal management module 140 may be external to the CMS 126. The emergency service provider device 108, the store device 114, the facility device 116, and the administrator device 118 can communicate with the portal management module 140 to create and modify facility related data. With portal management module 140 as shown in FIG. 2, all building data may optionally be generated or modified using one tool via, for example, a web browser.

The portal management module 140 may include collaborative tools with secure user accounts and permissions. In some embodiments, each user may be assigned a role with appropriate security credentials, such as an emergency service provider (emergency service provider device 108), an administrator (administrator device 118), a facility manager (facility device 116), and a store manager (store device 114). The administrator device 118 may have higher security clearance in terms of accessing and updating data, and modifying settings. The portal management module 140 can provision devices 108, 114, 116, and 118 and user accounts, and associate the devices 108, 114, 116, 118 to the user accounts.

As noted above, the portal management module 140 may be separated into further components. For example, a first portal management module (not shown) can manage the creation and modification of the electronic facility maps 136, a second portal management module (not shown) can manage the annotations 144, and a third portal management module (not shown) can manage facility metadata 138.

The emergency service provider device 108 may be configured to have permission to annotate electronic facility maps 136, namely to annotate electronic facility maps 136 with service resources related to their emergency service, but may not have permission to alter electronic facility maps 136. The annotation 144 can include an icon to graphically represent a position of the service resource within the facility. For example, the service resource can be an entrance (e.g., main or secondary), a pipe connection (e.g., stand or sprinkler), a fire hydrant (e.g., private or city), a gas shut off, a lock box, a fan (e.g., pressurized or exhaust), a waste disposal room/chute/dumpster (i.e., garbage, recycling, and/or organics), a firefighter phone, an elevator, a sprinkler room, a fire hose cabinet and class, an emergency back-up generator, an overhead door, a main electrical shut off, a roof hatch, an annunciator panel, a roof access stairwell, a unit number, a stairwell label, an access code, a smoke detector, and/or a defibrillator.

The facility device 116 may be configured to change venue and store/room descriptions, logos and so on, but may not have permission to alter electronic facility maps 136, etc.

The store device 114 can modify or alter data relating to the store/tenant account that it is associated with. Additional rules may be enforced if desired. For example, users of store/tenant devices may only access and/or change certain data pertaining to certain stores, and so on.

For example, a venue editor may log into portal 140 make edits to an electronic facility map 136 and save the electronic facility map 136 at different stages. The unfinished electronic facility map 136 may be saved in draft mode, where the venue editor may not have permission to publish the updated electronic facility maps 136 until approved by administrator or facility owner from the administrator device 118 or the facility device 116, and the wayfinding system 100 may be configured to track approvals.

To help enable system users, namely emergency service personnel, to create, edit, and maintain the annotations 144 to the electronic facility maps 136, in a useful and correct manner, the wayfinding system 100 may provide one or more map editing tools or frameworks. The map editing tools may be part of the wayfinding system 100, and may be accessed, for example, via the portal management module 140 or in any other suitable way. For example, if not part of the portal management module 140 of the wayfinding system 100, and/or the server platform 112 may include a separate map annotations editing module. The map annotations editing tool may preferably be configured to help emergency service personnel, with little to no design and/or programming experience, to create, edit, and maintain data, such as annotations 144 that can be used in the operation of the wayfinding system 100. The map annotations editing tool may have any suitable configuration that can help guide and/or assist system users in creating their desired data in a useful manner, while still being relatively easy to use and allowing emergency service personnel a relatively high degree of autonomy and design freedom with respect to the annotations 144.

Figure 3:
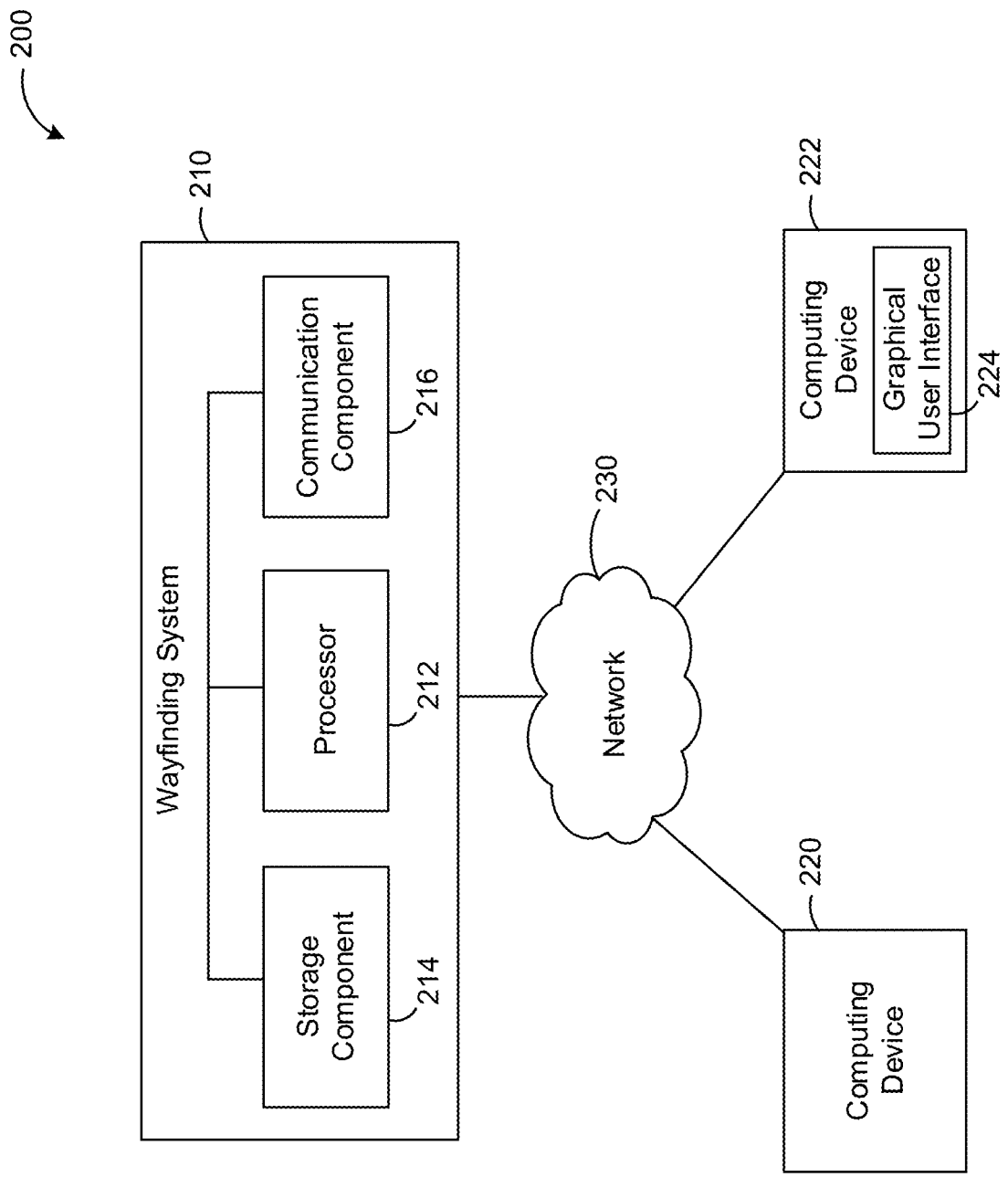
FIG. 3 is a block diagram of a wayfinding system for indoor navigation of emergency services, in accordance with at least one embodiment.

FIG. 3 shows a block diagram 200 of an example wayfinding system 210 in communication with computing devices 220, 222 via a network 230. Computing devices 220, 222 are similar to the emergency service provider device 108 in that they may be associated with an account of an emergency service provider (i.e., first responder). Although two computing devices 220, 222 are shown in FIG. 1, the wayfinding system 210 can be in communication with fewer or more computing devices 220, 222. The wayfinding system 210 can communicate with the computing devices 220, 222 over a wide geographic area via the network 230.

As shown in FIG. 3, the wayfinding system 210 includes a processor 212, a storage component 214, and a communication component 216. The wayfinding system 210 may include one or more servers that may be distributed over a wide geographic area and connected via the network 230. In some embodiments, each of the processor 212, the storage component 214 and the communication component 216 may be combined into a fewer number of components or may be separated into further components.

The processor 212 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the wayfinding system 210. In some embodiments, the processor 212 can include more than one processor with each processor being configured to perform different dedicated tasks.

The processor 212 may be configured to control the operation of the wayfinding system 210. The processor 212 can include modules that initiate and manage the operations of the wayfinding system 210. The processor 212 may also determine, based on received data, stored data, and/or user preferences, how the wayfinding system 210 may generally operate.

The communication component 216 may be any interface that enables the wayfinding system 210 to communicate with other devices and systems. In some embodiments, the communication component 216 can include at least one of a serial port, a parallel port or a USB port. The communication component 216 may also include at least one of an Internet, Local Area Network (LAN), Ethernet, Firewire, modem, fiber, or digital subscriber line connection. Various combinations of these elements may be incorporated within the communication component 216.

For example, the communication component 216 may receive input from various input devices, such as a mouse, a keyboard, a touch screen, a thumbwheel, a track-pad, a track-ball, a card-reader, voice recognition software and the like depending on the requirements and implementation of the wayfinding system 210.

The storage component 214 can include RAM, ROM, one or more hard drives, one or more flash drives or some other suitable data storage elements such as disk drives, etc. The storage component 214 is used to store an operating system and programs, for example. For instance, the operating system provides various basic operational processes for the processor 212. The programs include various user programs so that a user can interact with the processor 212 to perform various functions such as, but not limited to, viewing and/or manipulating the electronic facility maps 136 and annotations 144, as well as retrieving and/or transmitting position data of the computing device 220, 222 as the case may be.

The storage component 214 may include one or more databases (not shown). The storage component 214 stores electronic facility maps 136 and annotations 144 for the electronic facility maps 136. In some embodiments, the storage component 214 can store wayfinding data including routing algorithms 134, facility metadata 138 including information related to the facilities, owners, property management, and tenants, jurisdiction maps 142, and emergency services metadata including information related service providers, and information related to computing devices 220, 222.

Electronic facility maps 136 described herein can include any two-dimensional or three-dimensional representation of the facility. The electronic facility maps 136 can have any size and resolution and can contain objects that comply with any appropriate standard. In some embodiments, the objects of the electronic facility maps 136 can be adjusted in one or more pre-processing stages.

The computing devices 220, 222 may be any networked device operable to connect to the network 230. A networked device is a device capable of communicating with other devices through a network such as the networks 120, 230. A network device may couple to the network 230 through a wired or wireless connection.

The computing devices 220, 222 may include at least a processor and memory, and may be an electronic tablet device, a personal computer, workstation, server, portable computer, mobile device, personal digital assistant, laptop, smart phone, WAP phone, an interactive television, video display terminals, gaming consoles, and portable electronic devices or any combination of these.

In some embodiments, the computing devices 220, 222 may be a laptop, a smartphone device, or a wearable device (e.g., a smart watch, smart glasses) equipped with a network adapter for connecting to the Internet. In some embodiments, the connection request initiated from the computing devices 220, 222 may be initiated from a web browser and directed at the browser-based communications application on the wayfinding system 210. The computing device 222 may include a graphical user interface (GUI) 224. GUI 225 can be integral or separate from computing device 222. Although only computing device 222 is shown in FIG. 1 as having a GUI 224, more computing devices 220 can include a GUI 224.

During an emergency event, the computing device 220, 222 can also be located on-site at a facility or off-site from the facility. The computing device 220, 222 can be a mobile device and/or a wearable device that emergency service personnel can carry on-site at the facility. When located on-site, the computing device 220, 222 can determine its instantaneous position within the facility. The position can be an indoor position or an outdoor position. The computing device 220, 222 can determine its position based on communication with the network 230. Alternatively, the computing device 220, 222 can include indoor positioning technology for determining its position. The position of the computing device 220, 222 typically includes latitude and longitude coordinates, and a floor number if its position is indoors.

The position of the computing device 220, 222 can be an instantaneous position, that is, it can reflect the position of the computing device 220, 222 at a particular instant in time. The instantaneous position of the computing device 220, 222 can be determined on a pre-defined timing interval. For example, the pre-defined timing interval can be about 1 second, or any appropriate frequency considering the resources of network 230 and the nature of the emergency service.

In addition, the position of the computing device 220, 222 can be inputted to the computing device 220, 222 by an express indication or confirmation from the emergency service personnel. In some embodiments, the position of the computing device 220, 222 as determined by the computing device 220, 222 itself (based on communication with the network 230 or indoor positioning technology) without manual input may be inaccurate. In such cases, the position of the computing device 220, 222 can be overridden and manually input.

As well, when the computing device 220, 222 is not carried on-site at the facility, it may be in a stationary location on-site or off-site. When the computing device 220, 222 is stationary, emergency service personnel can use other channels, such as cellular or radio communications, to provide an express indication or confirmation of their location to be inputted by a user at the computing device 220, 222.

The network 230 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the wayfinding system 210 and the computing device 220, 222.

The network 230 can include components located within the facility such as beacons and Wi-Fi interface components from which a computing device 220, 222 located within the facility can determine its position.

As noted above, the wayfinding system 210 of FIG. 3 can be include one or more servers that may be distributed over a wide geographic area and connected via the network 230 and each of the processor 212, the storage component 214 and the communication component 216 can be separated into further components.

Figure 4:
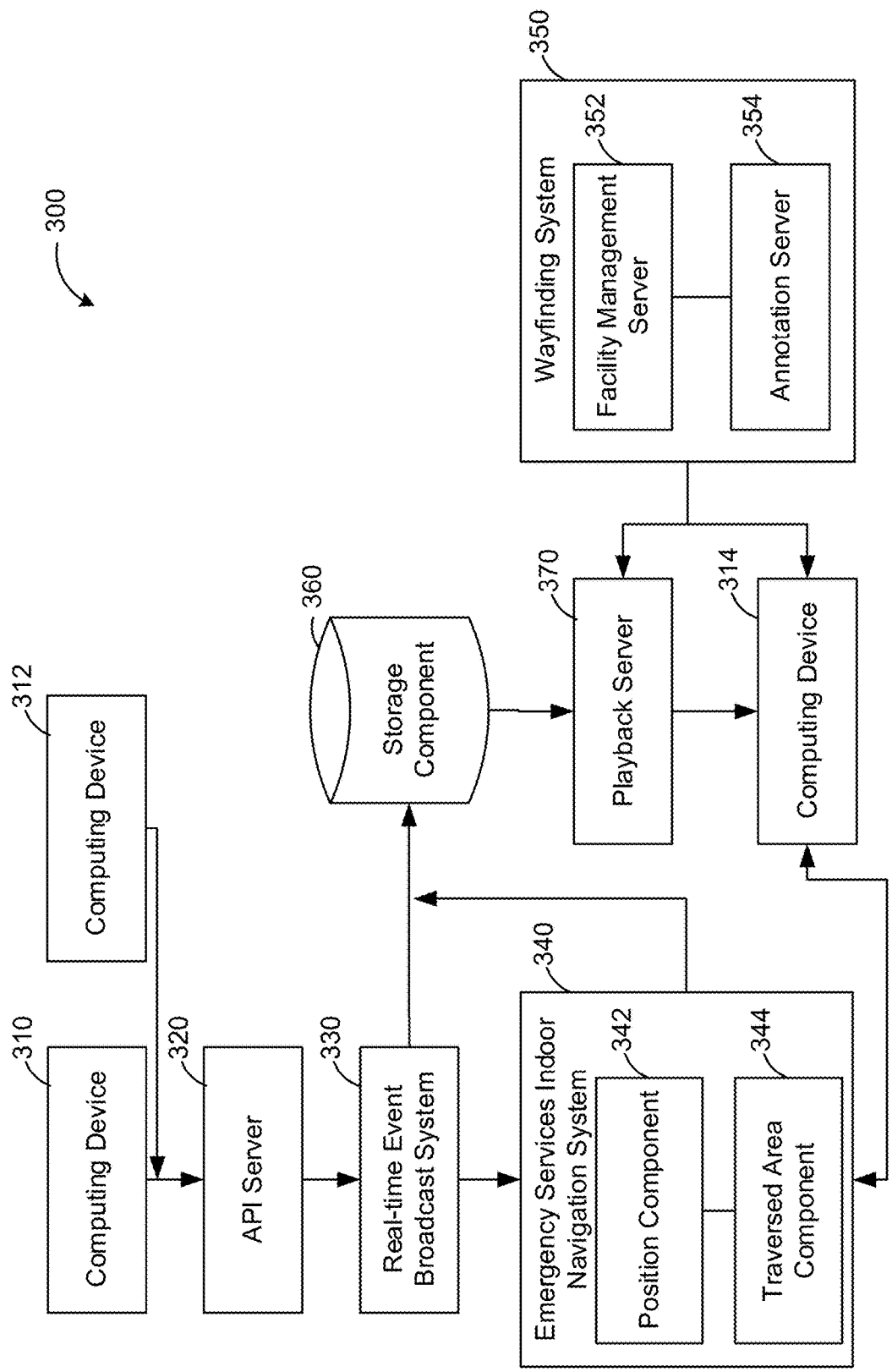
FIG. 4 is a block diagram of another wayfinding system for indoor navigation of emergency services, in accordance with at least one embodiment.

FIG. 4 shows a block diagram 300 of an example emergency services indoor navigation system 340. As shown in FIG. 4, the emergency services indoor navigation system 340 can include a positioning component 342 and a traversed area component 344. The emergency services indoor navigation system 340 is in communication with computing devices 310, 312 via an API server 320 and a real-time event broadcast system 330. As well, the emergency services indoor navigation system 340 is in communication with a third computing device 314 and a storage component 360. Also shown in FIG. 4 is a playback server 370 and a wayfinding system 350.

In the embodiment shown in FIG. 4, the emergency services indoor navigation system 340 is distributed on a separate component from the playback server 370 and the wayfinding system 350. It may be desirable for the emergency services indoor navigation system 340 to be separate from the playback server 370 and the wayfinding system 350 in order to provide dedicated computing resources for the time-sensitive and safety-related applications (i.e., indoor navigation of emergency services). In this manner, time-sensitive and safety-related applications are not competing with applications that are not time-sensitive (i.e., replay of a past event) and non-safety-related applications (i.e., traditional wayfinding).

For illustration purposes only, computing devices 310, 312 will be described as being wearable devices that are worn by emergency service personnel on-site at a facility during an emergency event and computing device 314 will be described as being stationary and used by a commander of the emergency service personnel carrying the computing devices 310, 312. Computing device 314 can be located on-site or off-site of the facility. However, it will be understood that fewer or more computing devices can be located on-site or off-site.

As emergency service personnel move within the facility, the computing devices 310, 312 can determine their positions and transmit the determined positions along with identifying data about themselves to API server 320. A computing device 310, 312 may determine its position using indoor positioning technology, such as that available with iOS® devices, or by communicating with a network, such network 230 of FIG. 3. Position data transmitted from the computing device 310, 312 to the API server 320 can represent geographical coordinates (i.e., longitude and latitude), a facility or venue identifier, and/or an indoor position (i.e., floor number). Identifying data can include an identifier and a time stamp. In some embodiments, the computing device 310, 312 can be configured to report its position to the API server 320 on a pre-determined regular timing interval. For example, the pre-determined regular timing interval can be 1 second.

In some embodiments, the computing device 310, 312 can be configured to report its position at a particular location, or "landmark". For example, a computing device 310, 312 can be configured to report its position when it enters a different floor or area within the facility. In some embodiments, the computing device 310, 312 can report its position based on location and time.

The API server 320 can receive data from the computing device 310, 312 as a request to push the data to the real-time event system 330. Upon receipt of a request from a computing device 310, 312, the API server 320 can log and/or store the request. In addition, the API server 320 can validate the request. Validating a request can involve verifying the validity of identifying data of the computing device 310, 312, including the timing of the request, and/or verifying the validity of the position data. In verifying the validity of the identifying data of the computing device 310, 312, the API server 320 can determine if the computing device 310, 312 is provisioned in the system 300 by the portal management module 140 with a user identifier. If the computing device 310, 312 is not provisioned in the system 300 by the portal management module 140 with an associated user, the API server 320 may not transmit the data to the real-time broadcast system 330.

In verifying the validity of the position data, the API server 320 can determine if the position data falls within the boundary of the facility. If the position data is outside of the facility, the API server 320 may not transmit the data to the real-time broadcast system 330. Upon validating a request of the computing device 310, 312, the API server 320 can transmit data from the computing device 310, 312 to the real-time broadcast system 330.

The real-time broadcast system 330 can manage and broadcast events in high volumes to consumers of the broadcast. Managing events can involve receiving an event, that is, the data from the computing device 310, 312, via the API server 320, determining whom to broadcast this data to. The real-time broadcast system 330 can maintain a plurality of categories. Upon receipt of an event, the real-time broadcast system 330 can determine which category the event falls within and determine consumers, or subscribers, or recipients of a broadcast for that category. In some embodiments, the real-time broadcast system 330 can maintain a list of categories and the consumers of each of those categories.

In the context of the present disclosure, the terms "real-time" or "near real-time" is defined as events or actions within a small temporal window of one another. The purpose of real-time or near real-time navigation is to provide navigation from the indoor navigation system 210 to the computing device 222 within seconds after the position of computing device 220 is detected in order to provide the current location of the user of computing device 220 to the user of computing device 222. Accordingly, the user of computing device 222 can provide related instruction to the emergency service personnel of computing device 220 with minimal delay, for timely action/execution of the command.

Any one of the computing devices 310, 312, the API server 320, and/or the real-time broadcast system 330 can be configured to begin or enable and end or disable the transmission and broadcast. For example, the computing device 310, 312 may be configured to start or stop the transmission of its position to the API server 320. As well, each of the API server 320 and the real-time broadcast system 330 may be configured to start or stop the transmission. Since the transmission is in a series configuration, the transmission can be stopped by any one of the API server 320 and the real-time broadcast system 330 even while the computing devices 310, 312 automatically, or by default, transmit its position to the API server 320. In some embodiments, the configuration of the API server 320 and/or the real-time broadcast system 330, that is the transmission can be controlled at computing device 314.

Enabling and disabling the transmission and broadcast of the position of computing devices 310, 312 can allow a user, such as the user at computing device 314 to expressly indicate the start and end of an emergency event to the emergency services indoor navigation system 340. In some cases, the start of an emergency event may be indicated before any emergency service personnel carrying computing devices 310, 312 arrive on-site. In some cases, the start of an emergency event may be indicated after some emergency service personnel carrying computing devices 310, 312 arrive on-site. In some cases, the end of an emergency event may be indicated after a mission (such as a sweep) has been completed or after some emergency service personnel have left the site.

As shown in FIG. 4, the emergency services indoor navigation system 340 and the storage component 360 can receive alerts, that is, the data reported by the computing devices 310, 312 from the real-time broadcast system 330. The storage component 360 is shown in FIG. 4 as being external to the emergency services indoor navigation system 340. In some embodiments, the storage component 360 can be internal to the emergency services indoor navigation system 340. Furthermore, in some embodiments, the storage component 360 can also be an external storage component for the wayfinding system 350 (not shown). The storage component 360 can store the position data of the computing devices 310, 312 from the real-time broadcast system 330.

The emergency services indoor navigation system 340 can include a positioning component 342 and a traversed area component 344 for processing the broadcasted event, that is, the position data and identifying data of the computing device 310, 312.

The positioning component 342 can correlate the position data of the computing device 310, 312 to a location within an electronic facility map 136. That is, the positioning component 342 can determine a position of the computing device 310, 312 in a coordinate space of an electronic facility map 136. The position of the computing device 310, 312 in the coordinate space of the electronic facility map 136 can be transmitted to computing device 314.

Computing device 314 can display the electronic facility map 136 and the position of the computing devices 310, 312 within the facility. The position of the computing devices 310, 312 can be illustrated by any appropriate indicator. For example, the position of a computing device 310, 312 can be indicated by an icon at a location. In other embodiments, a less precise indicator can be used, such as a highlighted region or a highlighted area.

The traversed area component 344 can consolidate, or integrate the position data of one or more computing devices 310, 312. For each computing device 310, 312, the traversed area component 344 can determine a total area traversed by that computing device 310, 312 based on all position data of that computing device 310, 312 during that event. The traversed area component 344 can compare a first traversed area at a first time instance from the computing device 310, 312 and a second traversed area at a second time instance, or a subsequent time instance, from the computing device 310, 312.

If the first traversed area at the first time instance from the computing device 310, 312 is the same as the second traversed area at the second time instance from the computing device 310, 312, the traversed area component 344 can determine that the computing device 310, 312 has not moved. In such cases, the traversed area component 344 can decide to exclude, or omit the position data of either one of the first time instance or the second time instance from the total traversed area of that computing device 310, 312.

If the first traversed area at the first time instance from the computing device 310, 312 is different from the second traversed area at the second time instance from the computing device 310, 312, the traversed area component 344 can determine that the computing device 310, 312 has moved. In such cases, the traversed area component 344 can decide to include or retain the position data of both the first time instance and the second time instance from the computing device 310, 312. That is, the traversed area component 344 can determine a total traversed area of a computing device 310, 312 based on all unique positions of a computing device 310, 312 during an event.

In addition to determining a total area traversed by a computing device 310, 312, the traversed area component 344 can determine at total area traversed by all computing devices 310, 312. The traversed area component 344 can compare a first total traversed area from a first computing device 310 and a second total traversed area from a second computing device 312.

If the first total traversed area from the first computing device 310 contains the second total traversed area from the second computing device 312, the traversed area component 344 can determine that the second computing device 312 has traversed areas also traversed by the first computing device 310 and decide to exclude, or omit the position data of the second computing device 312 from the total traversed area. If any portion of the second total traversed area from the second computing device 312 is outside of the first total traversed area from the first computing device 310, the traversed area component 344 can determine that the second computing device 312 has traversed areas not traversed by the first computing device 310 and decide to include, or retain the position data of that portion traversed by the second computing device 312 and not traversed by the first computing device 310 in the total traversed area.

The emergency services indoor navigation system 340 can transmit the position data of the computing devices 310, 312 and/or transmit the total traversed area from one or more computing devices 310, 312 and/or to the computing device 314 and the storage component 360 for storage. The storage component 360 can store the total traversed area in relation to the position data received from the real-time broadcast system 330. In some embodiments, the storage component 360 can receive the position data from the emergency services indoor navigation system 340 only instead receiving the position data from the real-time broadcast system 330. In some embodiments, the emergency services indoor navigation system 340 can transmit the position of the computing device 310, 312 in the coordinate space of the electronic facility map 136 for storage in the storage component 360.

The computing device 314 can also receive the position of the computing devices 310, 312 within the facility from the emergency services indoor navigation system 340. The computing device 314 can also receive the electronic facility map 136 and annotations 144 for that emergency service from the wayfinding system 350. In particular, the computing device 314 can receive the electronic facility map 136 from the facility management server 352 and the annotations 144 from the annotation server 354 of the wayfinding system 350. As noted earlier, the annotations 144 are specific to the emergency service, and in particular, the computing device 314. In order to receive the appropriate annotations 144, computing device 314 can exchange identifying data with the wayfinding system 350 and/or annotation server 354 to specify the emergency service that it relates to.

To display the electronic facility map 136, including the position of the computing devices 310, 312 and/or the traversed area within the facility, computing device 314 can include a viewer and a graphical user interface (not shown in FIG. 4), similar to graphical user interface 224 of computing device 222. The viewer can be a web browser or a mobile application operating on the computing device 314. The viewer can display the electronic facility map 136 with the relevant annotations 144, the positions of the computing devices 310, 312, and/or the total traversed area overlaid therein. In some embodiments, the viewer can illustrate the total traversed area of all computing devices 310, 312. In some embodiments, the viewer can further distinguish the total traversed area of each computing device 310, 312.

In some embodiments, the viewer can also suppress the display of objects contained in the electronic facility map 136 that an emergency responder is not interested in. For example, electronic facility maps 136 can contain office desks, clothing display racks, and other objects that are not important for the emergency responder and that clutter the electronic facility map 136. Furthermore, the suppression of objects can be enabled or disabled by a user of the viewer or at various zoom levels.

Figure 5:
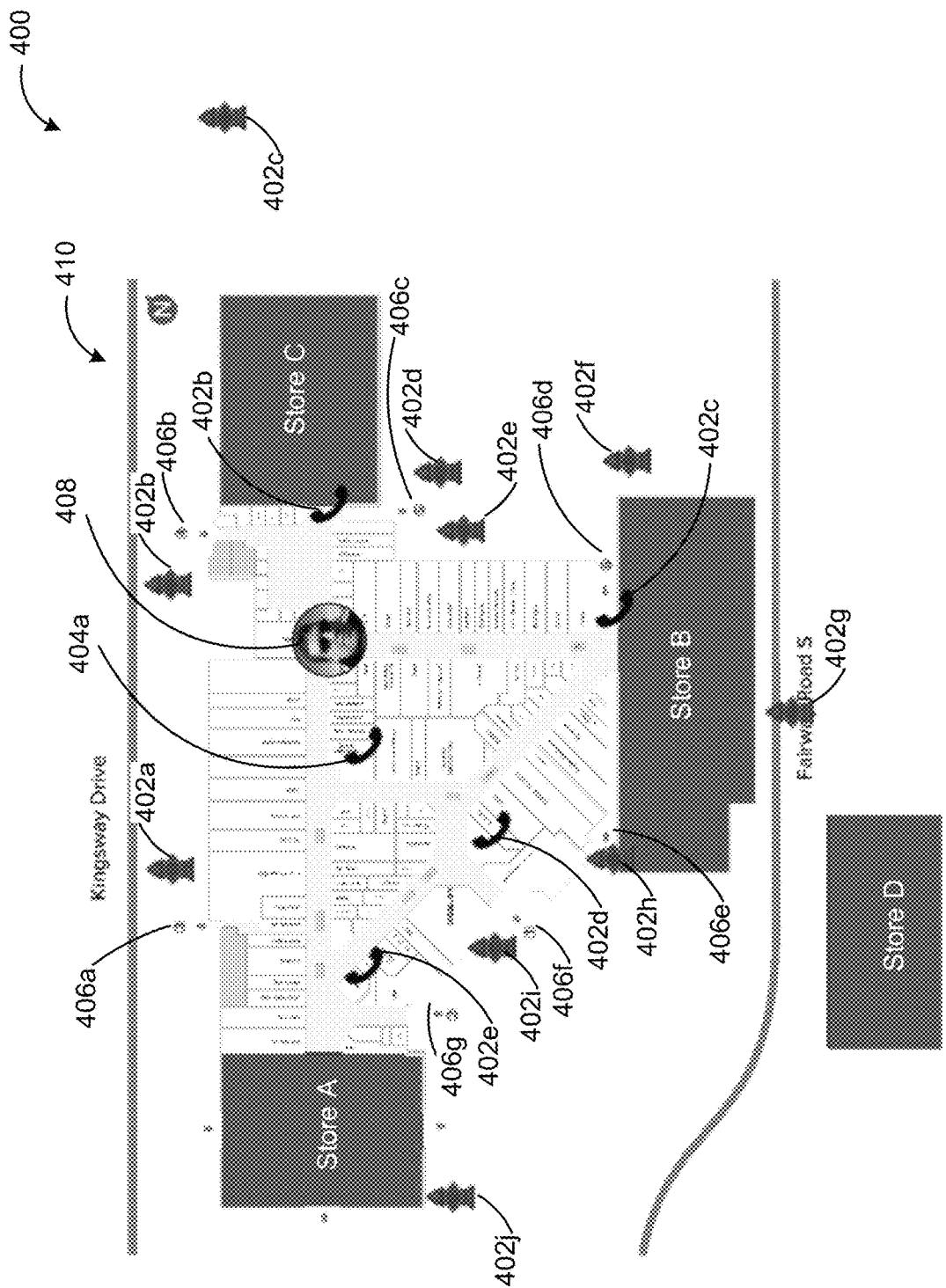
FIG. 5 is an example screen shot of a computing device within an electronic facility map.

Referring now to FIG. 5, shown therein is an example screen shot 400 of the viewer displaying a first computing device 408 and annotations within an electronic facility map 410. The electronic facility map 400 relates to a shopping center and includes graphical representations indicating, amongst other objects, stores and shopping center entrances 406a, 406b, 406c, 406d, 406e, 406f, 406g (herein collectively referred to as 406). In this example, the annotations 144 relate to fire hydrants 402a, 402b, 402c, 402d, 402e, 402f, 402g, 402h, 402i, 402j (herein collectively referred to as 402) and fire fighter phones 404a, 404b, 404c, 404d, 404e (herein collectively referred to as 404). As shown in FIG. 5, the first computing device 408 is indicated as being located at a first position by an icon containing an image of the user of the computing device 408.

Figure 6:
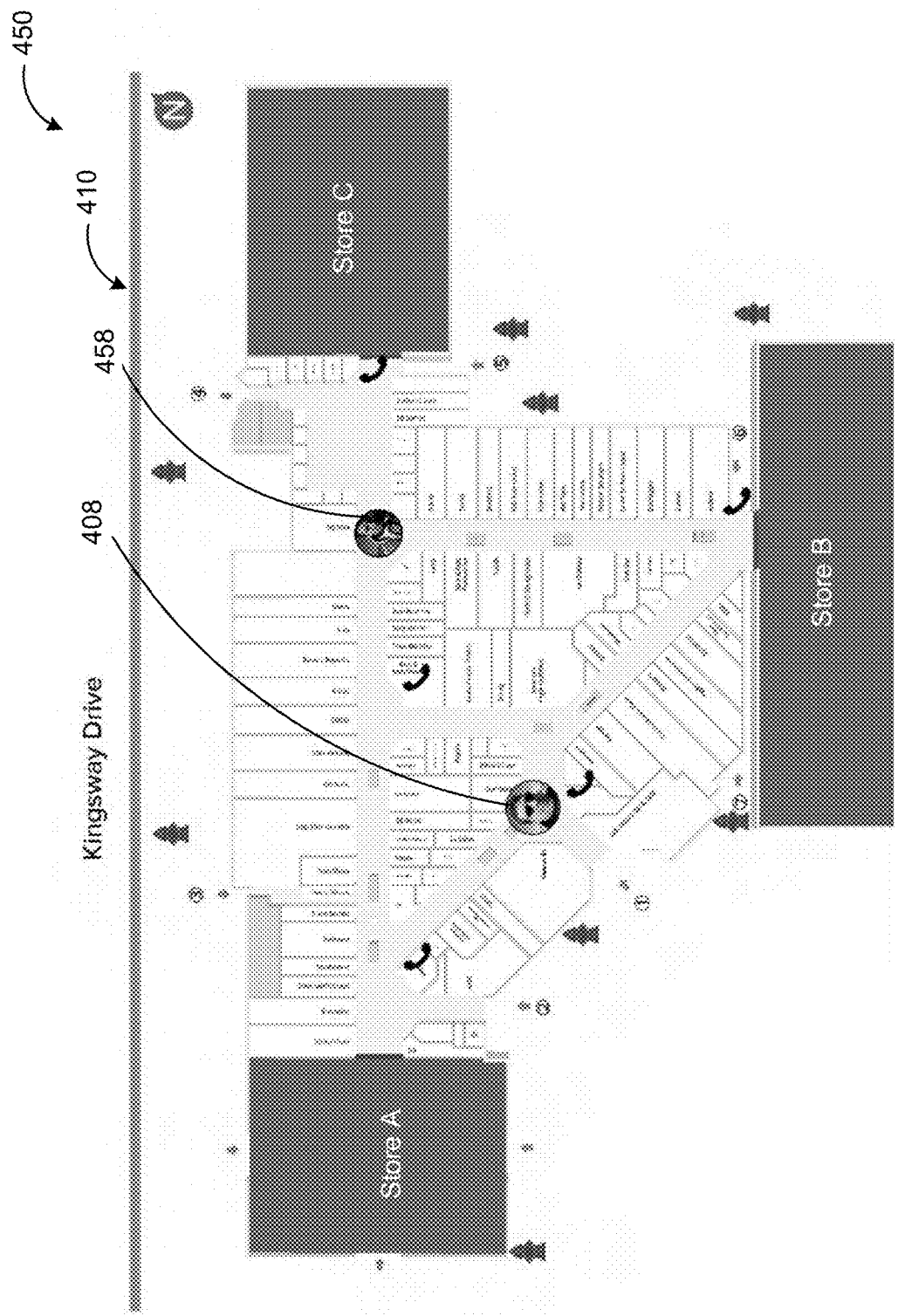
FIG. 6 is another example screen shot of two computing devices within the electronic facility map of FIG. 5.

Referring now to FIG. 6, shown therein is another example screen shot 450 of the viewer displaying the first computing device 408 and a second computing device 458 within the electronic facility map 410 shown in FIG. 5. In this example, the first computing device 408 is located in a second position, which can be at a different time instance than the first example shown in FIG. 5. The second computing device 458 is shown in FIG. 6 as being located in a similar position as the first computing device 408 in FIG. 5. As can be seen, the positions of the computing devices 408, 458 can be proxies for the position of the users of the computing devices 408, 458.

Figure 7:
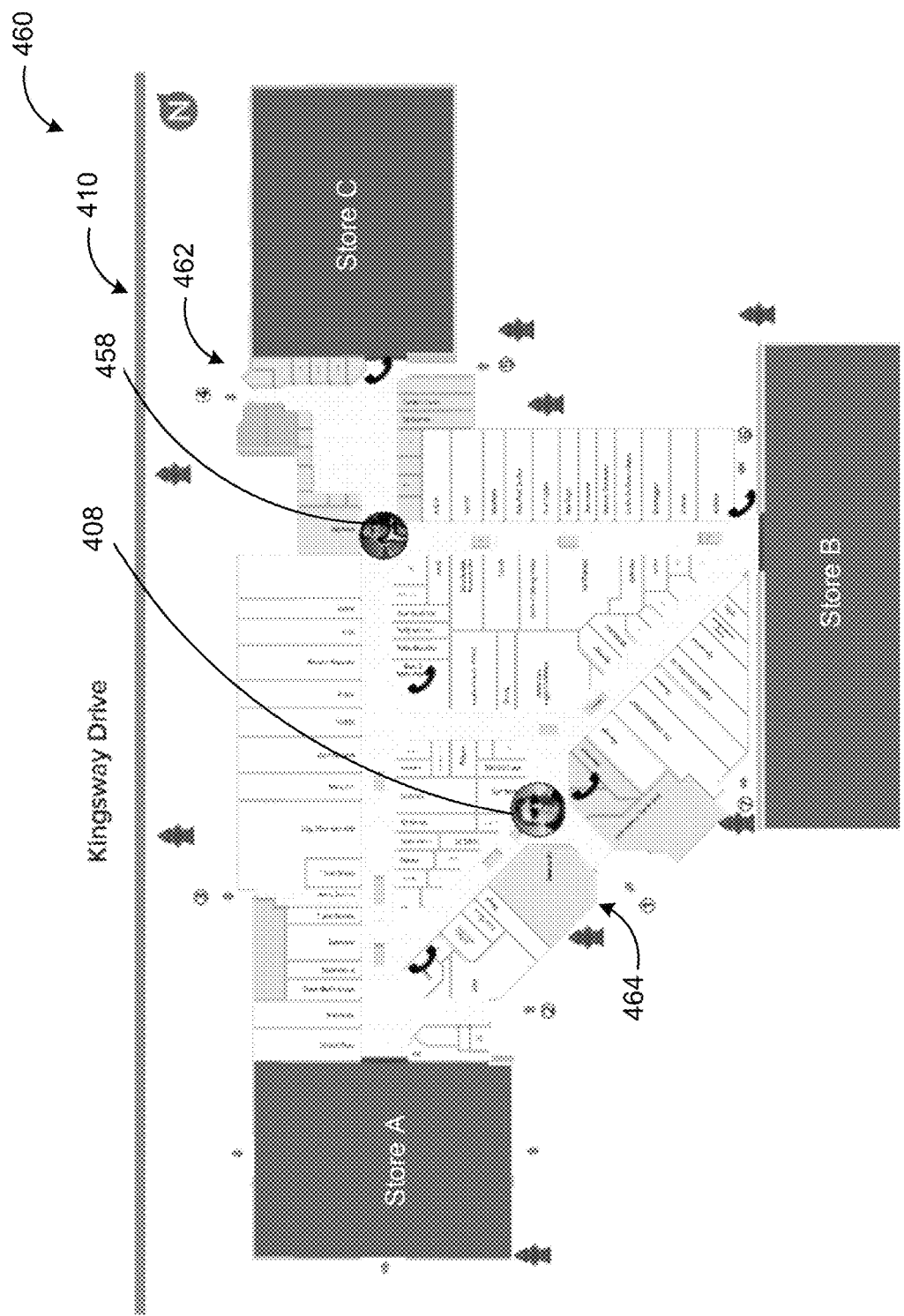
FIG. 7 is an example screen shot of traversed areas of the computing devices of FIG. 6 within the electronic facility map of FIG. 5.

Referring now to FIG. 7, shown therein is another example screen shot 460 of the viewer displaying the traversed areas 462, 464 of the computing devices 408, 458 of FIG. 6 within the electronic facility map 410. In this example, the first computing device 408 has traversed area 464, indicated by shading and the second computing device 458 has traversed area 462, also indicated by shading and including Store C.

As shown in FIGS. 5 to 7, the emergency services indoor navigation system 340 can track and display the position of a computing device 310, 312, allowing the user, particularly a commander, to view the location of the emergency service personnel under their command. The display of the position of a computing device in real-time is particularly advantageous for emergency services given how quickly emergency events can develop. Furthermore, the emergency services indoor navigation system 340 can track and display the position of a plurality of computing devices 310, 312, simultaneously. When a first user of computing device 310 encounters an issue, the user of computing device 314 will have access to real-time information on the location of the computing device 310, how they got there (i.e., via the traversed area), and make an informed decision. For example, the decision may relate to whether to send additional emergency service personnel, such as the user of computing device 312 and whether to direct additional emergency service personnel along the same route or a different route. Having information about how the user of a computing device 310 arrived at their present location be readily available is not possible with hardcopy paper maps.

In addition, by providing a total traversed area of computing devices 310, 312, a determination can be made of whether the entire facility has been inspected, or whether there are untraversed areas to be inspected.

In some embodiments, the emergency services indoor navigation system 340 can also display the position of any store devices 114, facility devices 116, administrator devices 118, and visitor devices 122 using the wayfinding system 350 if they are located within the facility. This information can assist emergency services personnel in evacuations and/or rescue missions, for example. In some embodiments, the wayfinding system 350 can administer privacy settings for the users of the devices 114, 116, 118, 122 to consent to the provision of their location to the emergency services indoor navigation system 340.

In some embodiments, the computing device 314 can be a computing device 310, 312 whose position is being tracked and displayed. That is, the computing device 310 can include a graphical user interface to display its own position within the facility and the position of other computing devices 312 within the facility.

As shown in FIG. 4, in some embodiments, the computing device 314 can also be in communication with a playback server 370. A user at the computing device 314 may wish to review completed missions or operations of past events stored in the storage component 360.

Instead of receiving the position of the computing devices 310, 312 within the facility from the emergency services indoor navigation system 340, the computing device 314 can receive the position of computing devices 310, 312 during a past event and stored in the storage component 360 from the playback server 370. Similar to real-time viewing, the computing device 314 can receive the electronic facility map 136 from the facility management server 352 and the annotations 144 from the annotation server 354 of the wayfinding system 350.

Similar to the emergency services indoor navigation system 340, the playback server can 370 process the position data received from the storage component 360. For example, if not stored in the storage component 360, the playback server 370 can determine the position data of the computing device 310, 312 in the coordinate space of the electronic facility map 136 and/or the total traversed data for display by the computing device 314.

Figure 8:
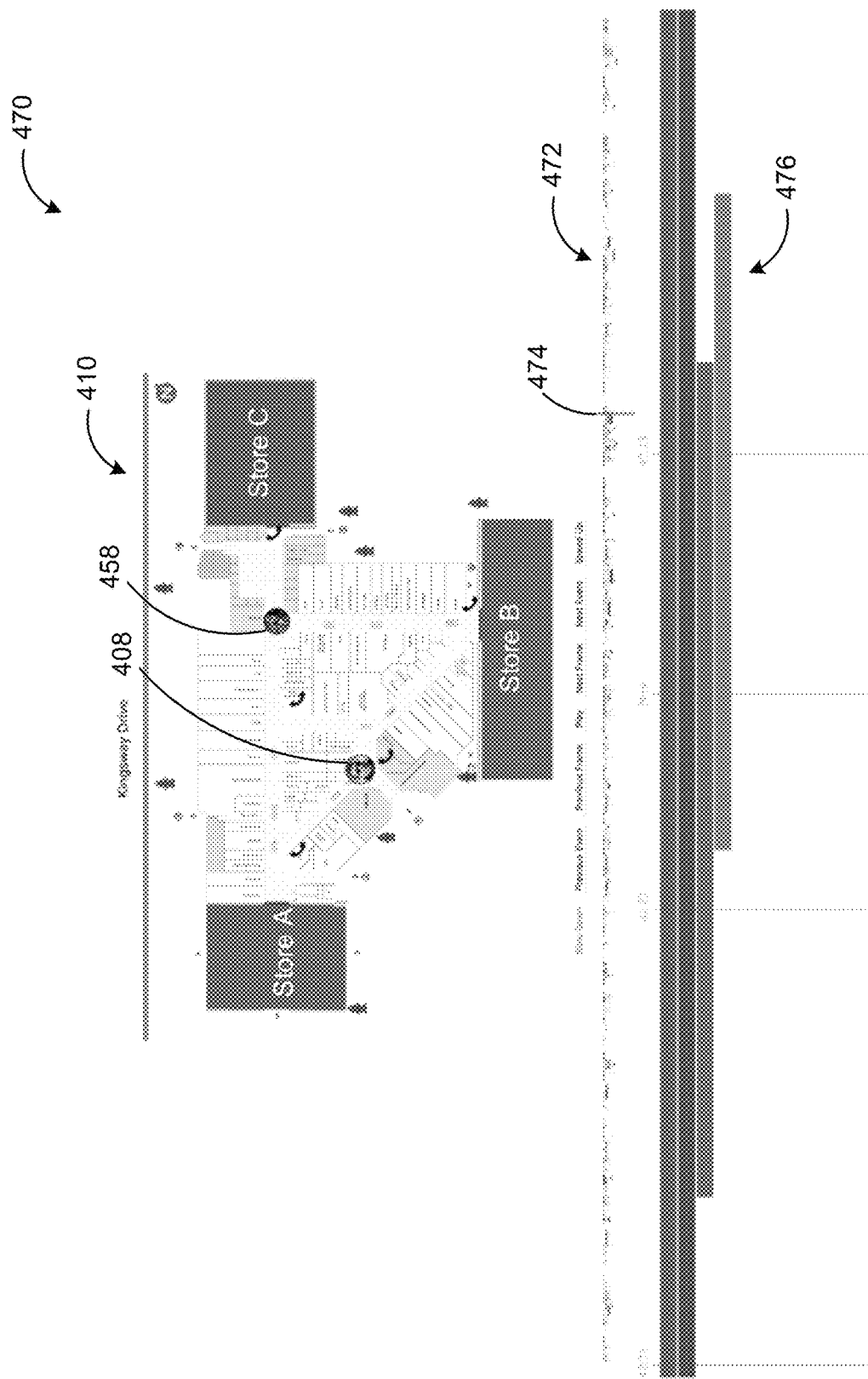
FIG. 8 is an example screen shot including the electronic facility map of FIG. 7 and a timeline of the event.

Referring now to FIG. 8, shown therein an example screen shot 470 of the viewer displaying the screen shot 460 of FIG. 7 along with a timeline of the event 472. The playback server 370 can generate a timeline 472 of the event, allowing for better navigation of the position data being reviewed. The timeline 472 can be navigated with pointer 474. In addition, a portion 476 of the timeline 472 can be magnified for greater temporal resolution of the timeline. The playback server 370 can also allow for different playback speeds. For example, a past event can be viewed in real-time, or at twice the speed for quicker review.

Figure 9:
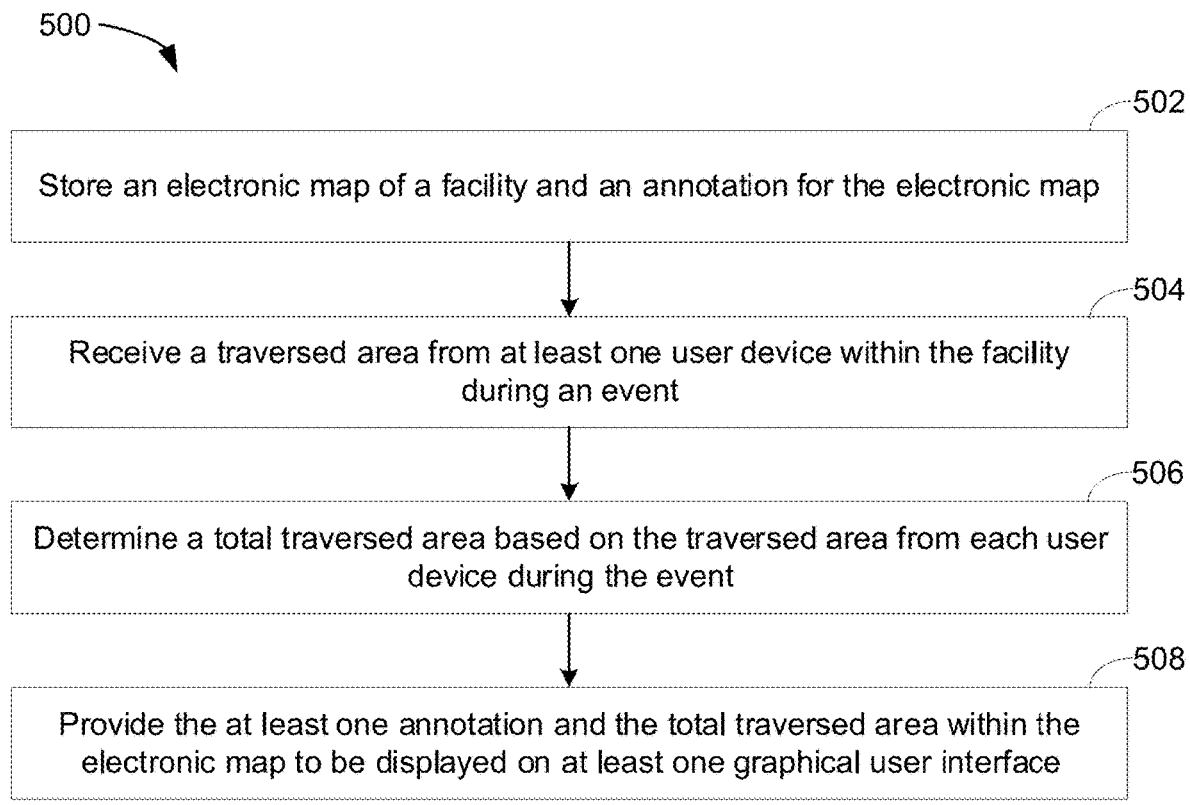
FIG. 9 is a block diagram of an example computer-implemented method for providing indoor navigation to emergency services, in accordance with at least one embodiment.

Referring now to FIG. 9, an example computer-implemented method 500 of providing indoor navigation to emergency services is shown in a flowchart diagram.

At 502, the wayfinding system 210, 350 stores at least one electronic map of a facility 136 and at least one annotation 144 for the at least one electronic map 136, the at least one annotation 144 being representative of a service resource within the facility.

At 504, the wayfinding system 210, 340 receives a traversed area from each of the at least one computing devices 220, 222, 310, 312, 314 within the facility during an event. The traversed area can be an instantaneous position of the computing device 220, 222, 310, 312, 314.

At 506, the wayfinding system 210, 340 determines a total traversed area based on the traversed area from each of the at least one computing devices 220, 222, 310, 312, 314 during the event.

At 508, the wayfinding system 210, 340 provides the at least one annotation 144 and the total traversed area within the at least one electronic map 136 to be displayed on at least one graphical user interface 224, 314.

While the above description provides examples of one or more apparatus, methods, or systems, it will be appreciated that other apparatus, methods, or systems may be within the scope of the claims as interpreted by one of skill in the art.

The invention claimed is:

1. A system of indoor navigation for emergency services, the system comprising:
at least one storage component for storing at least one electronic map of a facility and at least one annotation for the at least one electronic map, the at least one annotation being representative of a service resource within the facility;
a communication component to transmit data including a traversed area within the facility from at least one computing device via a communication network; and
a processor operatively coupled to the at least one storage component and the communication component, the processor being configured for:
receiving the traversed area from each of the at least one computing device within the facility during an event;
determining a total traversed area based on the traversed area of each of the at least one computing device during the event by:
comparing a first traversed area of a first computing device and a second traversed area of a second computing device; and
when the first traversed area of the first computing device contains the second traversed area of the second computing device, excluding the second traversed area of the second computing device from the total traversed area;
when at least a portion of the second traversed area of the second computing device is outside of the first traversed area, including the at least a portion of the second traversed area of the second computing device in the total traversed area; and
providing the at least one annotation and the total traversed area within the at least one electronic map to be displayed on at least one graphical user interface.

2. The system of claim 1, wherein the processor being configured for providing the at least one annotation and the total traversed area within the at least one electronic map to be displayed on at least one graphical user interface comprises the processor being configured for providing a total traversed area for each computing device.

3. The system of claim 1, wherein the traversed area comprises an instantaneous position of a computing device within the facility.

4. The system of claim 3, wherein the processor being configured for providing the at least one annotation and the total traversed area within the at least one electronic map to be displayed on at least one graphical user interface further comprises the processor being configured for providing a current position of each of the at least one computing devices, the current position of a computing device being a most recent instantaneous position of that computing device.

5. The system of claim 3, wherein the instantaneous position of the computing device within the facility is determinable from at least one facility communication component located within the facility.

6. The system of claim 3, wherein the instantaneous position of the computing device within the facility is determined on a pre-defined timing interval.

7. The system of claim 3, wherein the instantaneous position of the computing device within the facility comprises a latitude, a longitude, and a floor number within the facility.

8. A system of indoor navigation for emergency services, the system comprising:
at least one storage component for storing at least one electronic map of a facility and at least one annotation for the at least one electronic map, the at least one annotation being representative of a service resource within the facility;
a communication component to transmit data including a traversed area within the facility from at least one computing device via a communication network; and
a processor operatively coupled to the at least one storage component and the communication component, the processor being configured for:
receiving the traversed area from each of the at least one computing device within the facility during an event;
determining a total traversed area based on the traversed area of each of the at least one computing device during the event by:
comparing a first traversed area at a first time instance of the computing device and a second traversed area at a second time instance of the computing device; and
when the first traversed area at the first time instance of the computing device is the same as the second traversed area at the second time instance of the computing device, excluding the second traversed area at the second time instance of the computing device of the total traversed area;
when the first traversed area at the first time instance of the computing device is the same as the second traversed area at the second time instance of the computing device, including the second traversed area at the second time instance of the computing device in the total traversed area; and
providing the at least one annotation and the total traversed area within the at least one electronic map to be displayed on at least one graphical user interface.

9. A computer-implemented method for providing indoor navigation to emergency services, the method comprising operating a processor to:
storing at least one electronic map of a facility and at least one annotation for the at least one electronic map, the at least one annotation being representative of a service resource within the facility;

receiving a traversed area of at least one computing device within the facility during an event;

determining a total traversed area based on the traversed area from each of the at least one computing device during the event by:

comparing a first traversed area of a first computing device and a second traversed area of a second computing device; and when the first traversed area of the first computing device contains the second traversed area of the second computing device, excluding the second traversed area of the second computing device from the total traversed area;

when at least a portion of the second traversed area of the second computing device is outside of the first traversed area, including the at least a portion of the second traversed area of the second computing device in the total traversed area; and providing the at least one annotation and the total traversed area within the at least one electronic map to be displayed on at least one graphical user interface.

10. A computer-implemented method for providing indoor navigation to emergency services, the method comprising operating a processor to:

storing at least one electronic map of a facility and at least one annotation for the at least one electronic map, the at least one annotation being representative of a service resource within the facility;

receiving a traversed area of at least one computing device within the facility during an event:

determining a total traversed area based on the traversed area from each of the at least one computing device during the event by:

comparing a first traversed area at a first time instance of the computing device and a second traversed area at a second time instance of the computing device; and when the first traversed area at the first time instance of the computing device is the same as the second traversed area at the second time instance of the computing device, excluding the second traversed area at the second time instance of the computing device of the total traversed area;

otherwise including the second traversed area at the second time instance of the computing device in the total traversed area; and providing the at least one annotation and the total traversed area within the at least one electronic map to be displayed on at least one graphical user interface.

11. The method of claim 10, wherein providing the at least one annotation and the total traversed area within the at least one electronic map to be displayed on at least one graphical user interface comprises providing a total traversed area for each computing device.

12. The method of claim 10, wherein the traversed area comprises an instantaneous position of a computing device within the facility.

13. The method of claim 12, wherein providing the at least one annotation and the total traversed area within the at least one electronic map to be displayed on at least one graphical user interface further comprises providing a current position of each of the at least one computing device, the current position of a computing device being a most recent instantaneous position of that computing device.

14. The method of claim 12, the instantaneous position of the computing device within the facility is determinable from at least one facility communication component located within the facility.

15. The method of claim 12, wherein the instantaneous position of the computing device within the facility is determined on a pre-defined timing interval.

16. The method of claim 12, wherein the instantaneous position of the computing device within the facility comprises a latitude, a longitude, and a floor number within the facility.

17. The method of claim 10, wherein at least one graphical user interface of the at least one graphical user interface is provided on a computing device of the at least one computing device.

18. The method of claim 10, wherein the at least computing device comprises at least one of a wearable device, a smart watch, a mobile device, a smart phone, and a tablet.

* * * * *